(12) United States Patent
Kim (10) Patent No.: US 7,911,957 B2
(45) Date of Patent: Mar. 22, 2011

(54) ZERO-DELAY QUEUING METHOD AND SYSTEM

(75) Inventor: Byoung-Chul Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 272 days.

(21) Appl. No.: 12/068,228

(22) Filed: Feb. 4, 2008

(65) Prior Publication Data

US 2008/0186989 A1    Aug. 7, 2008

(30) Foreign Application Priority Data

Feb. 7, 2007    (KR) .................. 10-2007-0012740

(51) Int. Cl.
*H04J 1/16* (2006.01)
*H04L 12/28* (2006.01)

(52) U.S. Cl. ............... 370/235; 370/252; 370/412

(58) Field of Classification Search .......... 370/235, 370/252, 412, 465
See application file for complete search history.

(56) References Cited

U.S. PATENT DOCUMENTS

| | | | |
|---|---|---|---|
| 6,594,234 B1* | 7/2003 | Chard et al. ........... | 370/236 |
| 6,975,638 B1* | 12/2005 | Chen et al. ........... | 370/412 |
| 7,292,578 B1* | 11/2007 | Kerr et al. ........... | 370/395.32 |
| 7,333,508 B2* | 2/2008 | Rabie et al. ........... | 370/466 |
| 7,562,364 B2* | 7/2009 | Sanjay ........... | 709/240 |
| 2003/0081546 A1* | 5/2003 | Agrawal et al. ........... | 370/229 |
| 2003/0128707 A1* | 7/2003 | Kalkunte et al. ........... | 370/395.41 |
| 2004/0017825 A1* | 1/2004 | Stanwood et al. ........... | 370/468 |
| 2005/0169172 A1* | 8/2005 | Wang et al. ........... | 370/229 |
| 2005/0175014 A1* | 8/2005 | Patrick ........... | 370/395.43 |
| 2006/0187830 A1* | 8/2006 | Nam ........... | 370/229 |
| 2006/0187949 A1* | 8/2006 | Seshan et al. ........... | 370/412 |
| 2007/0153690 A1* | 7/2007 | Stanwood et al. ........... | 370/230 |
| 2008/0065772 A1* | 3/2008 | Tindal et al. ........... | 709/226 |

* cited by examiner

Primary Examiner — Andrew Lee
(74) Attorney, Agent, or Firm — H.C. Park & Associates, PLC

(57) ABSTRACT

A zero-delay queuing method and system. The zero-delay queuing method includes the steps of: when a packet corresponds to a class set to perform zero-delay queuing, transferring the packet to a zero-delay queue; when a size of the packet does not exceed a CR value set for the class, transferring the packet to a strict priority transfer queue; and forwarding the packet existing in the strict priority transfer queue prior to packets existing in general data transfer queues. According to the zero-delay queuing method and system, it is possible to forward specific traffic requiring real-time transfer without delay, and furthermore, it is possible to serve packets corresponding to a zero-delay queue while ensuring a Peak Rate (PR) value as well as a Committed Rate (CR) value.

15 Claims, 5 Drawing Sheets

ZERO-DELAY QUEUING METHOD AND SYSTEM

CLAIM OF PRIORITY

This application makes reference to, incorporates the same herein, and claims all benefits accruing under 35 U.S.C. §119 from an application for ZERO DELAY QUEUING METHOD AND SYSTEM earlier filed in the Korean Intellectual Property Office on 7 Feb. 2007 and there duly assigned Serial No. 2007-0012740.

BACKGROUND OF THE INVENTION

1. Field of the Invention

The present invention relates to a zero-delay queuing method and system, and more particularly, to a zero-delay queuing method and system in which a Class-Based Queuing (CBQ) scheduler transfers specific traffic requiring real-time transfer without delay and also performs queuing through first to third phases to ensure a uniform Committed Rate (CR) and Peak Rate (PR) even when traffic is very congested.

2. Description of the Related Art

In a routing system supporting interfaces having various bandwidths, a bottleneck is caused when traffic is transferred from an input interface having a large bandwidth to an output interface having a small bandwidth. In this case, a Quality of Service (QoS) scheduler selectively drops a packet at the bottleneck point or transfers packets according to a queuing mechanism, thereby adjusting the entire flow of traffic.

When the flow of traffic is adjusted by selectively dropping a packet, there is no delay caused by packet buffering. The packet loss, however, may result in abnormal transfer of information.

Meanwhile, when a packet is transferred according to a queuing mechanism, the QoS scheduler performs a shaping function to uniformly transfer traffic without dropping the packet. According to the shaping function, an overflowing packet is buffered and transferred to adjust a bandwidth of transferred packets. When performing the shaping function, the QoS scheduler buffers traffic exceeding a reference value of a bandwidth allocated to each class to save the information of the traffic, and thus reduction of traffic loss is possible. Packets, however, are buffered and then transferred, and thus causing transfer delay.

A CBQ (Class Based Queuing) scheduler performs queuing based on a packet class. In order to support CBQ scheduling when traffic is very congested in an interface having a small bandwidth, e.g., T1/E1, T3 or Ethernet, a scheduler operation period is required in consideration of the CBQ scheduler's operation overhead. Here, during a period of several milliseconds in which the scheduler operates, packets must wait to be transferred in respective class queues, which results in queuing of traffic or scheduling delay. In other words, the CBQ scheduler can somewhat reduce transfer delay of packets but cannot prevent basic transfer delay of packets.

Currently, there is no method of transferring specific traffic, for example, traffic requiring real-time transfer, without queuing or scheduling delay in a CBQ scheduler. Meanwhile, when traffic is very congested in the corresponding interface, there is no method of transferring the traffic which should be transferred without queuing or scheduling delay ensuring a CR (Committed Rate) and a PR (Peak Rate). In this case, the CR (Committed Rate) means a uniform transfer quantity for the traffic. And, the PR can be ensured when there is available bandwidth in the interface during a scheduling period.

Therefore, CBQ schedulers require a zero-delay queuing mechanism that may transfer a packet without transfer delay, and furthermore, may transfer a packet while ensuring a uniform CR and PR of traffic even when the traffic is very congested.

SUMMARY OF THE INVENTION

It is therefore an object of the present invention to provide an improved queuing method and an improved queuing system to solve the problems as stated above.

It is another object of the present invention to provide a zero-delay queuing method whereby a Class-Based Queuing (CBQ) scheduler may transfer traffic requiring real-time transfer without queuing or scheduling delay, and a CBQ queuing method capable of ensuring a Committed Rate (CR) and a Peak Rate (PR) of general data or a data packet on which zero-delay queuing is performed even when traffic is very congested.

A first aspect of the present invention provides a zero-delay queuing method, including the steps of: when a packet corresponds to a class set to perform zero-delay queuing, transferring the packet to a zero-delay queue; when a size of the packet does not exceed a CR value set for the class, transferring the packet to a strict priority transfer queue; and forwarding the packet existing in the strict priority transfer queue prior to packets existing in general data transfer queues.

When a packet does not correspond to the class set to perform zero-delay queuing, the packet may be transferred to a general data queue.

When the size of the packet exceeds the CR value set for the class, unreserved bandwidth obtained from CR values of the zero-delay queue and general data queues may be further allocated to ensure a PR value of the class, and then the packet may be transferred to the strict priority transfer queue.

The zero-delay queuing method may further include the step of: when it is determined that there is no unreserved bandwidth, queuing the packet and further allocating unused bandwidth obtained from CR values of classes of packets queued in the respective general data queues to transfer the packet to the strict priority transfer queue.

The unused bandwidth obtained from CR values of classes of packets queued in the respective general data queues may be calculated by summing the CR values set for the classes corresponding to all queues except the zero-delay queue, summing smaller values between bytes of a packet queued in each class queue and waiting for service during a current scheduling period and bytes of a CR value set for each of the classes, and then calculating a difference between the sums.

The zero-delay queuing method may further include the step of: when an operation period of a corresponding scheduler expires, resetting the CR value using a CR-byte refresh routine and ensuring the CR value for the class of the zero-delay queue during a next scheduling period.

A second aspect of the present invention provides a zero-delay queuing system including: a CBQ scheduler transferring a packet corresponding to a class set to perform zero-delay queuing to a zero-delay queue, performing zero-delay scheduling, and then transferring the packet to a driver multiplexer (MUX); and a driver queue forwarding the packet corresponding to the zero-delay queue prior to a general data packet.

The CBQ scheduler may include: the zero-delay queue immediately transferring the packet corresponding to a class set to perform zero-delay queuing to the driver queue without queuing; and a general data queue transferring a queued packet to the driver queue in every operation period of the CBQ scheduler.

The driver queue may include: a strict priority transfer queue forwarding the packet prior to a general data transfer queue; and the general data transfer queue queuing and forwarding a packet in a predetermined order.

The zero-delay scheduling may include first to third zero-delay scheduling phases.

In the first zero-delay scheduling phase, the packet corresponding to the class set to perform zero-delay queuing may be transferred to a strict priority transfer queue when a size of the packet does not exceed a CR value set for the class, and the second zero-delay scheduling phase may be performed when the size exceeds the CR value.

In the second zero-delay scheduling phase, CR values set for classes of the zero-delay queue and general data queues may be checked, the packet may be transferred to the strict priority transfer queue while ensuring a PR value of the class when there is unreserved bandwidth, and the third zero-delay scheduling phase may be performed when there is no unreserved bandwidth.

In the third zero-delay scheduling phase, the packet may be queued, a CR value may be calculated from lengths of packets queued in the respective general data queues, unused bandwidth may be further allocated to transfer the packet to the strict priority transfer queue when it is determined that there is unused bandwidth, and the packet is dropped when it is determined that there is no unused bandwidth.

The zero-delay queuing system may further include the driver MUX for transferring the packet received from the CBQ scheduler to the driver queue.

The CBQ scheduler may further include a class classifier for classifying a received packet according to a class with reference to a header of the packet.

BRIEF DESCRIPTION OF THE DRAWINGS

A more complete appreciation of the invention, and many of the attendant advantages thereof, will be readily apparent as the same becomes better understood by reference to the following detailed description, when considered in conjunction with the accompanying drawings, in which like reference symbols indicate like components, wherein.

DETAILED DESCRIPTION OF THE INVENTION

Hereinafter, exemplary embodiments of the present invention will be described in detail with reference to the accompanying drawings. In the following description, a detailed description of known functions and configurations incorporated herein has been omitted for conciseness. The following description will be made regarding conventional technologies and exemplary embodiments in which the present invention is applied to a zero-delay queuing method and system. It should be noted that the following exemplary embodiments are merely to help with understanding the present invention, and thus are not to be interpreted as limiting the scope of the present invention.

Figure 1:
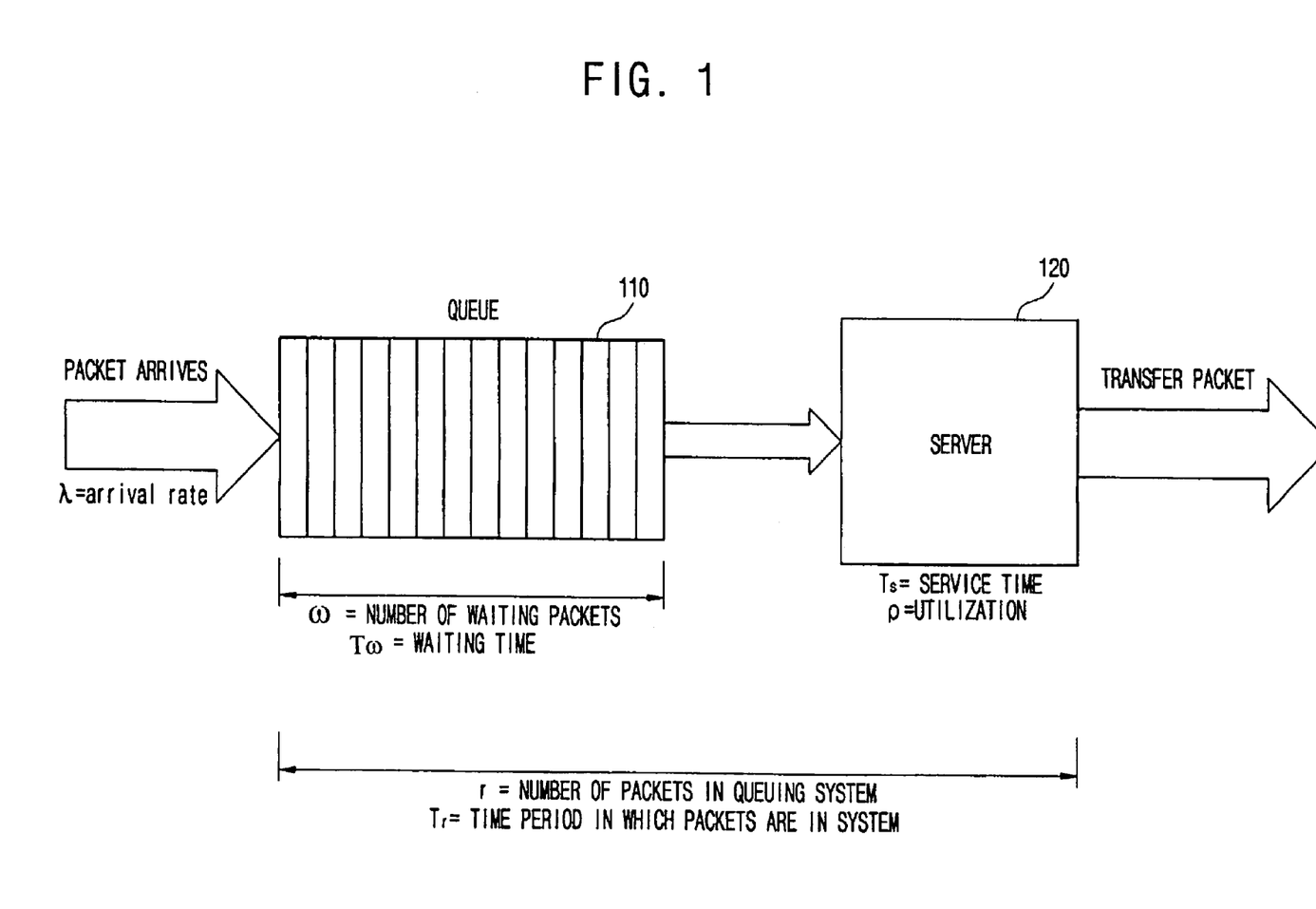
FIG. 1 illustrates a basic conventional queuing mechanism.
Figure 2:
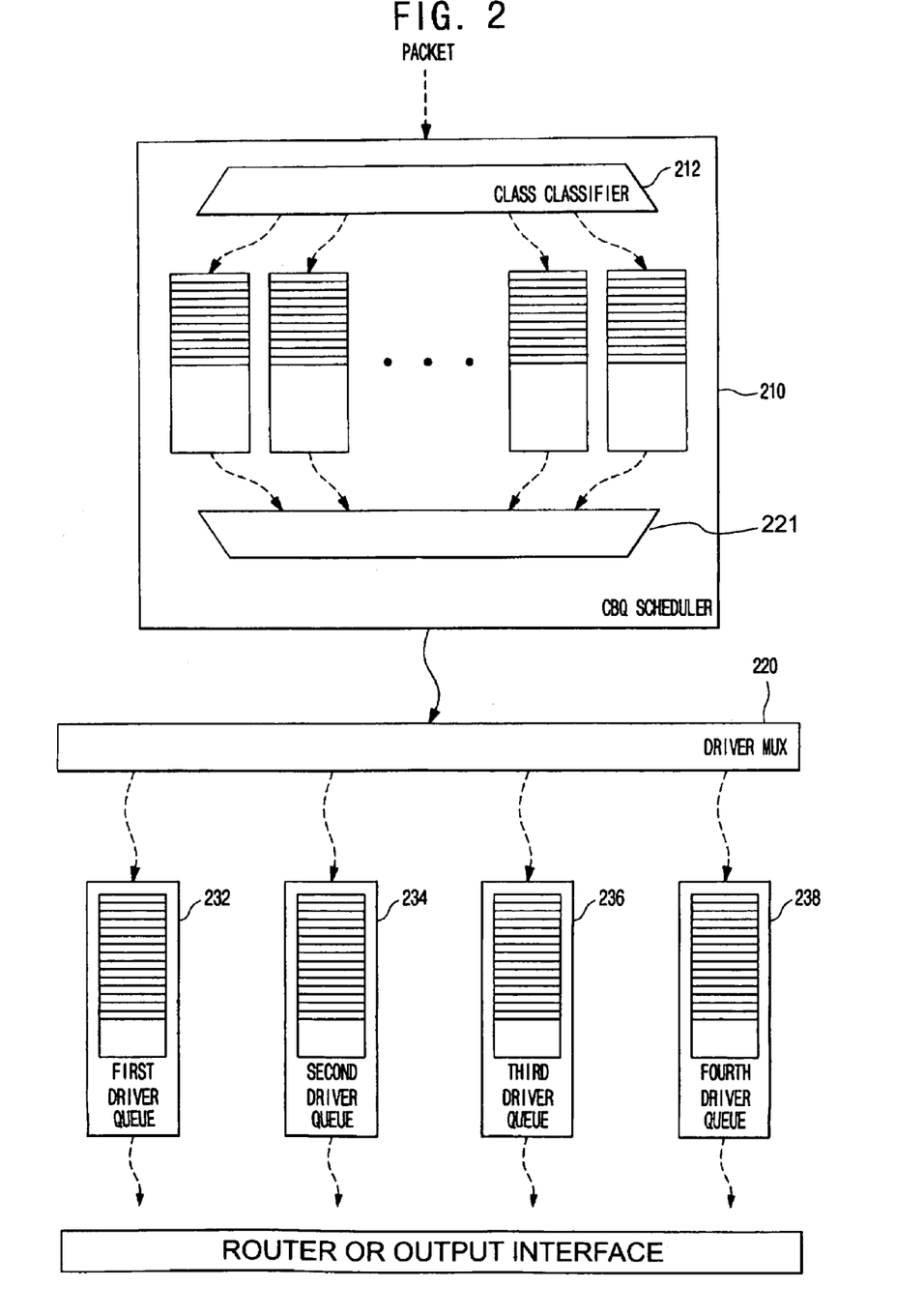
FIG. 2 is a block diagram of a conventional Class-Based Queuing (CBQ) system.
Figure 3:
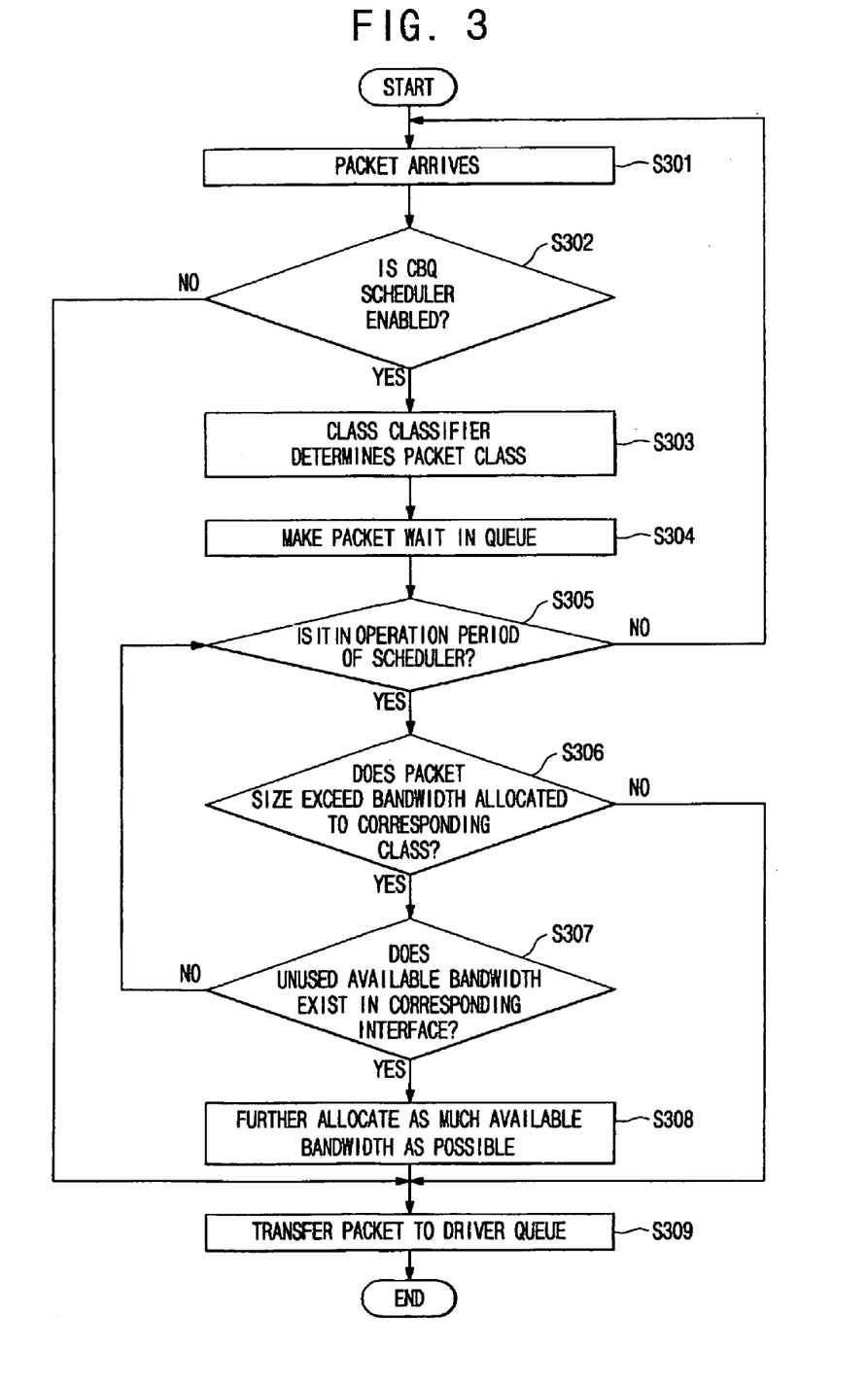
FIG. 3 is a flowchart showing a method of transferring a packet in a conventional CBQ system.

FIGS. 1-3 shows the background of the present invention. FIG. 1 illustrates a basic conventional queuing mechanism; FIG. 2 is a block diagram of a conventional Class-Based Queuing (CBQ) system; and FIG. 3 is a flowchart showing a method of transferring a packet in a conventional CBQ system.

FIG. 1 illustrates a basic conventional queuing mechanism.

Basically, a queuing system comprises a queue 110 and a server 120. "r" is a total number of packets in queuing system and "$T_r$" is a time period in which packets are in system. According to the most basic queuing model, "λ" denotes an arrival rate (packets/sec) of packets arriving at the queuing system, e.g., a router. When a packet arrives at a specific time, there may be no packet waiting for service in queue 110. In this case, the packet can be transferred without any delay.

"ω" denotes an average number of packets waiting for service in queue 110, and "Tω" denotes an average time that a packet must wait in queue 110. Here, average time Tω includes even a time that the packets do not wait for service.

Average time Tω denotes a time period in which server 120 provides service to the packets. "ρ" is a server utilization denoting the utilization as a percentage of the capacity of server 120. For example, when the value of server utilization ρ is equal to 1, the entire resources of server 120 are utilized. In this case, arrived packets cannot receive service from server 120 and must wait in queue 110.

When the entire resources of server 120 are utilized, i.e., ρ=1, a time rate of packets transferred from the queuing system is always uniform regardless of a time rate of arriving packets. In such a limited environment, a maximum time rate of arriving packets that the system can process may be theoretically expressed as equation (1):

$$\lambda_{max} = \frac{1}{T_s} \tag{1}$$

where $T_s$ is service time of server 120.

When one packet m arrives, a number of ω packets on average wait to be transferred prior to packet m in queue 110. When packet m departs from queue 110 and is transferred, ω packets wait in queue 110 again. Here, Tω becomes an average waiting time.

At a bottleneck point, the number of packets waiting to be transferred in queue 110 increases, and thus delay is caused in transferring the packets.

While a current real-time content and streaming content service is provided in a network, delay or disconnection must be prevented. To this end, a bandwidth larger than a predetermined reference value must be ensured, and also transfer delay of packets must be minimized.

To reduce transfer delay of a specific packet, a CBQ service may be used. According to the CBQ (Class Based Queuing) service, queuing is performed based on a packet class. The CBQ service is provided by a CBQ scheduler that periodically operates, and the CBQ scheduler performs differentiated packet transfer based on a packet class. Therefore, queuing may be performed based on a method of setting a service requiring real-time data transfer as an upper class and transferring a packet corresponding to the upper class first. In this case, it is possible to minimize packet transfer delay.

FIG. 2 is a block diagram of a conventional CBQ system.

A CBQ system comprises a CBQ scheduler 210, a driver multiplexer (MUX) 220 and a plurality of driver queues 232, 234, 236 and 238.

CBQ scheduler 210 performs queuing based on a packet class. CBQ scheduler 210 includes a class classifier 212, which classifies an input packet according to a class based on a characteristic of the packet. Class classifier 212 checks a QoS class of this input packet with reference to a header of this packet. Then, CBQ scheduler 210 makes this packet wait on standby in the corresponding class queue.

CBQ scheduler 210 transfers this packet of each class to driver MUX 220 in its operation period.

Driver MUX 220 transfers this packet to the respective driver queues 232, 234, 236 and 238. Here, when a size of the packet exceeds a bandwidth allocated to the class, CBQ scheduler 210 allocates as much unused available bandwidth to the corresponding interface as possible, thereby transferring this packet to driver MUX 220.

Driver queues 232, 234, 236 and 238 transfer packets received from driver MUX 220. The CBQ system as shown in FIG. 2 includes a first driver queue 232, a second driver queue 234, a third driver queue 236 and a fourth driver queue 238. Packets are then further forwarded to a router or an output interface circuit after driver queues 232, 234, 236 and 238. Reference number 221 refers to an accumulator, i.e., a circuit or a unit storing intermediate results in a computing system.

FIG. 3 is a flowchart showing a method of transferring a packet in the conventional CBQ system.

When a packet arrives (step 301), it is determined whether CBQ scheduler 210 is enabled or not (step 302). When CBQ scheduler 210 is not enabled, this incoming packet is transferred to driver queues 232, 234, 236 and 238 without passing through a queuing process in CBQ scheduler 210.

When there is an empty queue to input a packet in CBQ scheduler 210, however, CBQ scheduler 210 determines a class of the input packet by class classifier 212 (step 303). Then, CBQ scheduler 210 queues this input packet in the corresponding class queue (step 304).

CBQ scheduler 210 itself determines whether it is in an operation period of CBQ scheduler 210 (step 305). When CBQ scheduler 210 is not in the operation period, CBQ scheduler 210 does not transfer a packet, and the process goes back to step 301. On the other hand, when CBQ scheduler 210 is the operation period, CBQ scheduler 210 determines whether a size of this packet exceeds a bandwidth allocated to the corresponding class (step 306).

When the packet size exceeds the bandwidth allocated to the corresponding class, CBQ scheduler 210 determines whether unused available bandwidth exists in the corresponding interface (step 307). When available bandwidth exists, CBQ scheduler 210 allocates as much of the available bandwidth as possible (step 308), and transfers this packet to driver queues 232, 234, 236 and 238 (step 309). On the other hand, when there is no available bandwidth, the process goes back to step 305.

When it is determined in step 306 that the packet size does not exceed the bandwidth allocated to the corresponding class, CBQ scheduler 210 transfers the packet to the driver queues 232, 234, 236 and 238.

Driver queues 232, 234, 236 and 238 forward the packet received from CBQ scheduler 210. As described above, when it is determined in step 302 that CBQ scheduler 210 is not enabled, the packet is directly transferred to driver queues 232, 234, 236 and 238 without the queuing process of CBQ scheduler 210. Consequently, a packet transfer process in the conventional CBQ system is finished.

As described above, a CBQ scheduler performs queuing based on a packet class. In order to support CBQ scheduling when traffic is very congested in an interface having a small bandwidth, e.g., T1/E1, T3 or Ethernet, a scheduler operation period is required in consideration of the CBQ scheduler's operation overhead. Here, during a period of several milliseconds in which the scheduler operates, packets must wait to be transferred in respective class queues, which results in queuing of traffic or scheduling delay. In other words, the CBQ scheduler can somewhat reduce transfer delay of packets but cannot prevent basic transfer delay of packets.

Currently, there is no method of transferring specific traffic, for example, traffic requiring real-time transfer, without queuing or scheduling delay in a CBQ scheduler. Meanwhile, when traffic is very congested in the corresponding interface, there is no method of transferring the traffic which should be transferred without queuing or scheduling delay ensuring a CR (Committed Rate) and a PR (Peak Rate). In this case, the CR means a uniform transfer quantity for the traffic. And, the PR maybe ensured when there is available bandwidth in the interface during a scheduling period.

Therefore, CBQ schedulers require a zero-delay queuing mechanism that may transfer a packet without transfer delay, and furthermore, may transfer a packet while ensuring a uniform CR and PR of traffic even when the traffic is very congested.

Figure 4:
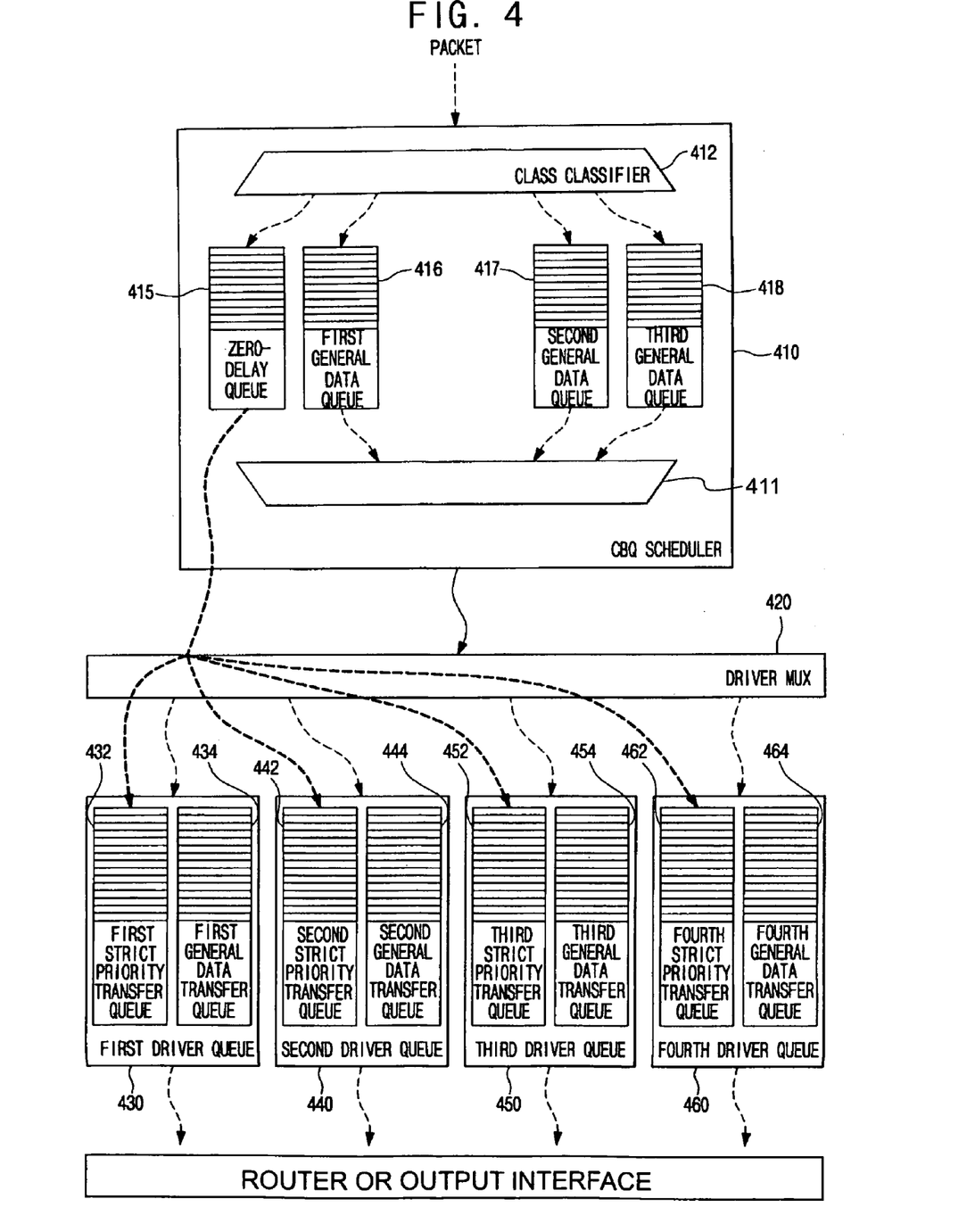
FIG. 4 is a block diagram of a zero-delay CBQ system constructed according to an exemplary embodiment of the present invention.

FIG. 4 is a block diagram of a zero-delay Class-Based Queuing (CBQ) system constructed to an exemplary embodiment of the present invention.

The basic constitution of the CBQ system constructed to an exemplary embodiment of the present invention is the same as that of a conventional CBQ system, and also functions of the components are similar to those of the conventional CBQ system. Therefore, the same descriptions will be omitted, and only the difference from the conventional components will be described below.

The CBQ system includes a CBQ scheduler 410, a driver multiplexer (MUX) 420 and a plurality of driver queues 430, 440, 450 and 460.

CBQ scheduler 410 performs zero-delay queuing constructed to a program corresponding to a pseudocode. The pseudocode is a language used for representing an operation algorithm of each module during software development. The pseudocode as a program design language is not an actual programming language, but rather is for describing a task and an operation process of the module. The pseudocode facilitates understanding of a program algorithm. A pseudocode for performing zero-delay queuing suggested by the present invention will be described in detail later.

When the program is executed, CBQ scheduler 410 designates a queue having the highest transfer priority as a zero-delay queue 415. Queues not designated as zero-delay queue 415 by CBQ scheduler 410 become general data queues 416, 417 and 418.

Packets queued in general data queues 416, 417 and 418 are transferred by periodic operation of CBQ scheduler 410. On the other hand, packets existing in zero-delay queue 415 are immediately transferred to strict priority transfer queues 432, 442, 452 and 462 of driver queues 430, 440, 450 and 460 without queuing or scheduling delay.

In addition, CBQ scheduler 410 may set a Committed Rate (CR) value and a Peak Rate I(PR) value for a class corresponding to zero-delay queue 415, like a class corresponding to general data queues 416, 417 and 418 of CBQ scheduler 410. To support the CR value and the PR value set for zero-delay queue 415, CBQ scheduler 410 performs 3-phase scheduling.

When receiving a packet from zero-delay queue 415 of CBQ scheduler 410, driver MUX 420 transfers this packet to strict priority transfer queues 432, 442, 452 and 462. In addition, when receiving a packet from general data queues 416, 417 and 418 of CBQ scheduler 410, driver MUX 420 transfers the packet to general data transfer queues 434, 444, 454 and 464.

As shown in FIG. 4, driver queues 430, 440, 450 and 460 respectively have one of strict priority transfer queues 432, 442, 452 and 462 and one of general data transfer queues 434, 444, 454 and 464. While managing these two kinds of queues, respective driver queues 430, 440, 450 and 460 apply different packet transfer methods to their queues. General data transfer queues 434, 444, 454 and 464 store all packets and forward them in a predetermined order. On the other hand, when a packet exists in strict priority transfer queues 432, 442, 452 and 462, strict priority transfer queues always forward this packet prior to general data transfer queues 434, 444, 454 and 464. For example, in first driver queue 430, a packet existing in first strict priority transfer queue 432 is forwarded prior to a packet existing in first general data transfer queue 434.

To immediately transfer a specific packet without queuing, the CBQ system constructed to an exemplary embodiment of the present invention has the zero-delay queue and the strict priority transfer queues.

The zero-delay queuing whereby a packet is transferred without queuing delay cannot be supported by a conventional scheduling algorithm. Since packets corresponding to a zero-delay queue are not queued, a CR value cannot be ensured for a general data queue when data is congested in the zero-delay queue. Consequently, a scheduler performing the zero-delay queuing cannot perform a bandwidth management function. In other words, while the scheduler first transfers packets having a higher priority order, it cannot ensure a uniform CR value and PR value for general data or data packets on which the zero-delay queuing is performed. Therefore, CBQ scheduler 410 constructed to an exemplary embodiment of the present invention performs the 3-phase scheduling to ensure a CR value and a PR value for the class corresponding to zero-delay queue 415. In the present invention, the 3-phase scheduling is performed by a program represented by a pseudocode.

The first scheduling phase is a CR ensuring step of transferring a packet without queuing delay according to a CR value set for the class corresponding to zero-delay queue 415. The second scheduling phase is a PR ensuring step of, when a size of a packet corresponding to the class of zero-delay queue 415 exceeds a CR value set for the scheduling period, checking CR values set for classes corresponding to zero-delay queue 415 and general data queues 416, 417 and 418, and when there is unreserved bandwidth, using the corresponding bandwidth. The third scheduling phase is a step of further allocating available bandwidth, which is unused by the classes corresponding to general data queues 416, 417 and 418 versus the CR values set for the classes, to packets corresponding to the class of zero-delay queue 415 but not transferred even in the second scheduling phase, and forwarding the packets.

A pseudocode of a scheduler supporting zero-delay queuing according to the present invention is given as below.

```
Read packet from input interface;                      -----> step 1
routing;                                               -----> step 2
if (output interface CBQ enabled)                      -----> step 3
{
    packet classification;                             -----> step 4
    if (packet is classified to zero delay queue)      -----> step 5
```

-continued

```
        zero_delay_queue_scheduler_1();                -----> step 6
    else
        enqueue packet;                                -----> step 7
}
else
    packet transmission;                               -----> step 8
if (in every predetermined scheduling period)
run cbq_scheduler();                                   -----> step 9
```

When a packet is read by an input interface in step 1, routing is determined in step 2. In this case, a method of processing the packet varies according to whether or not CBQ scheduler 410 of an output interface is enabled.

When CBQ scheduler 410 is enabled, queuing is performed through steps 3 to 7. On the other hand, when CBQ scheduler 410 is not enabled, the packet is forwarded without queuing in step 8. In step 8, a differentiated packet forwarding service, such as selective packet dropping, cannot be provided even when a size of the packet forwarded to the output interface exceeds available bandwidth.

When CBQ scheduler 410 of the output interface is enabled, it is determined in step 4 what class the packet corresponds to, and which service class queue the packet must be queued in according to the class through packet classification.

In step 5, it is determined that the packet corresponds to zero-delay queue 415. Packets corresponding to zero-delay queue 415 are queued through the first zero-delay queue scheduling phase in step 6. On the other hand, packets corresponding to general data queues 416, 417 and 418 other than zero-delay queue 415 are queued in a general way in step 7. The packets queued in general data queues 416, 417 and 418 other than zero-delay queue 415 in step 7 are forwarded in every predetermined scheduling period in step 9. The packets queued through zero-delay queue 415, however, are first forwarded through strict priority transfer queues 432, 442, 452 and 462 included in driver queues 430, 440, 450 and 460 of the above-described FIG. 4. Packets are then further forwarded to a router or an output interface circuit after driver queues 430, 440, 450 and 460. A CR scheduling step and a PR scheduling step refers to steps 3-7, and step 9 refers to a packet forwarding step in a driver queue. Reference number 411 refers to an accumulator.

The zero-delay scheduling performed by a CBQ scheduler includes a CR scheduling step and a PR scheduling step. In the CR scheduling step, packets queued in queues corresponding to all classes are transferred according to set CR values. In the PR scheduling step, the packets are transferred according to the CR values of all the classes, and then when available bandwidth exists for classes having remaining packets to be transferred in the corresponding scheduling period, the remaining packets are transferred according to PR values set for the classes. A pseudocode for performing the CR scheduling step and the PR scheduling step is given below.

```
cbq_scheduler()
{
    /* CR scheduling */
    while (every queue in CBQ)
    {
        Get packet from class in queue;
        if (packet size > class's CR)                  -----> (a)
            Get packet from next class;
        else
```

-continued

```
    transmit packet;
}
/* PR scheduling */
if (avail_bandwidth >0)
{
    while (every queue in CBQ)
    {
        Get packet from class in queue;
        if (packet size < class's PR) --------------------------> (b)
            transmit packet;
    }
}
}
```

Referring to the pseudocode, a queued packet is transferred according to a CR value set for each class queue in step (a). In step (b), when available bandwidth exists for classes having remaining packets to be transferred after step (a) in the corresponding scheduling period, the remaining packets are transferred while ensuring PR values.

Figure 5:
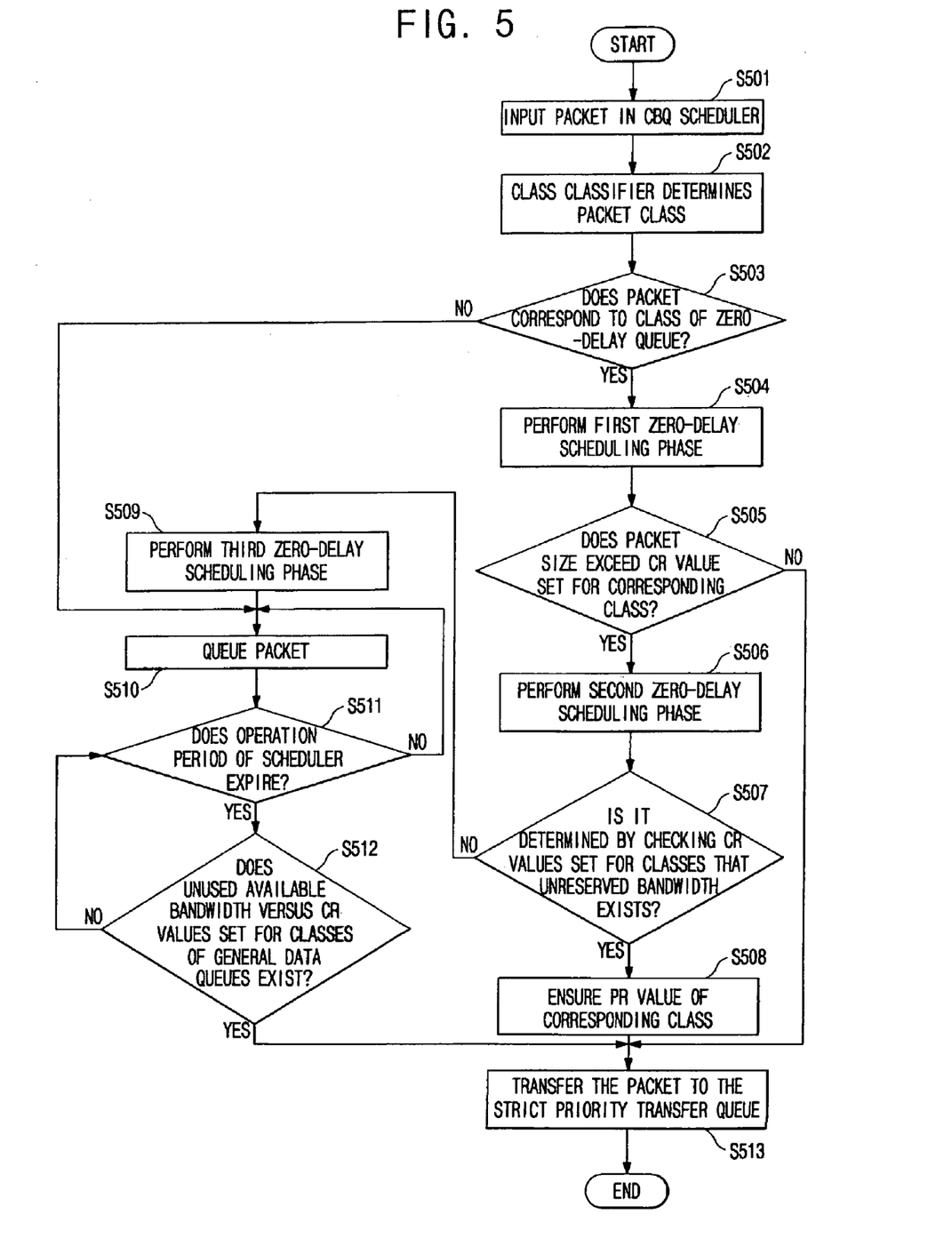
FIG. 5 is a flowchart showing a zero-delay queuing method constructed according to an exemplary embodiment of the present invention.

FIG. 5 is a flowchart showing a zero-delay queuing method constructed according to an exemplary embodiment of the present invention.

A process of the method begins when a packet is input to CBQ scheduler 410 (step 501). CBQ scheduler 410 determines a class of the packet using a class classifier 412 (step 502). CBQ scheduler 410 determines whether this input packet corresponds to a class of the zero-delay queue 415 (step 503).

When it is determined that the packet corresponds to the class of zero-delay queue 415, CBQ scheduler 410 performs a first zero-delay scheduling phase (step 504). CBQ scheduler 410 determines whether a size of this input packet exceeds a CR value set for the class (step 505). When this input packet size does not exceed the CR value set for the class, this input packet is transferred to strict priority transfer queues 432, 442, 452 and 462 (step 513).

On the other hand, when the packet size exceeds the CR value, CBQ scheduler 410 performs a second zero-delay scheduling phase (step 506). CBQ scheduler 410 checks CR values set for classes of zero-delay queue 415 and general data queues 416, 417 and 418, and determines whether unreserved bandwidth exists (step 507). When unreserved bandwidth exists, CBQ scheduler 410 ensures a PR value of the class using the unreserved bandwidth (step 508). Subsequently, CBQ scheduler 410 transfers the packet to strict priority transfer queues 432, 442, 452 and 462 (step 513).

On the other hand, when it is determined instep 507 that there is no unreserved bandwidth, CBQ scheduler 410 performs a third zero-delay scheduling phase (step 509).

In the second zero-delay scheduling phase, the PR value is ensured using the unreserved bandwidth obtained from the CR value of zero-delay queue 415 set by a user and CR values set for the general data queue classes. In the third zero-delay scheduling phase, however, unused available bandwidth is calculated from CR values of classes of packets queued in general data queues 416, 417 and 418 and used. In the third zero-delay scheduling phase, CR bytes for the class of the zero-delay queue 415 is ensured by a CR-byte refresh routine during a next scheduling period.

When performing the third zero-delay scheduling phase, CBQ scheduler 410 queues the packet (step 510). Subsequently, CBQ scheduler 410 determines whether its operation period expires (step 511). When the scheduler operation period does not expire, CBQ scheduler 410 queues the packet until a new scheduling period begins.

When the operation period of CBQ scheduler 410 expires, and a new scheduling period begins, it is determined based on the CR values of the classes of packets queued in general data queues 416, 417 and 418 whether there is unused available bandwidth (step 512). When unused available bandwidth exists, CBQ scheduler 410 allocates the additional bandwidth to transfer the packet to strict priority transfer queues 432, 442, 452 and 462 (step 513). On the other hand, when there is no unused available bandwidth versus the CR values set for the classes corresponding to general data queues 416, 417 and 418, CBQ scheduler 410 queues the packet until a new scheduling period begins.

Strict priority transfer queues 432, 442, 452 and 462 forward the packet prior to packets existing in general data transfer queues 434, 444, 454 and 464, thereby finishing the entire process.

When it is determined in step 503 that the packet corresponds to a class of general data queues 416, 417 and 418 other than that of zero-delay queue 415, the process goes to step 510 so that CBQ scheduler 410 queues the packet. Subsequently, the successive procedure is performed.

Operation of a class-based scheduler for performing zero-delay queuing will now be described in detail according to respective phases.

A pseudocode for performing the first zero-delay scheduling phase is given below. As described above, in the first zero-delay scheduling phase, a CR value set for the class corresponding to zero-delay queue 415 is ensured.

```
zero_delay_queue_scheduler_phase_1 ( )
{
    Get class's max forward CR bytes; ---------------------------->    step 1
    if (available max forward CR bytes)
        packet transmission; ---------------------------------------->    step 2
    else
        zero_delay_queue_scheduler_phase_2 ( ); ---------------->    step 3
}
```

In the pseudocode for performing the first zero-delay scheduling phase as shown above, CBQ scheduler 410 attempts to calculate a maximum forwarding CR bytes set for the class corresponding to zero-delay queue 415 and the maximum forwarding CR bytes may be transferred during a scheduling period of the output interface (step 1). If the maximum size of the forwarding CR value is greater than the input packet size, this input packet is transmitted without queuing (zero delay) (step 2). If the maximum forwarding CR bytes is smaller than the input packet size, the input packet is queued in the second zero-delay scheduling phase (step 3).

An algorithm for step 2 of the pseudocode, that is, for transferring a packet without queuing (zero delay), is given below.

```
if (p_class_cr_bytes – p_size) > 0)
{
    p_class_cr_bytes = p_class_cr_bytes – p_size;
    packet transmission;
}
```

Here, a variable p_class_cr_bytes denotes a value calculated in bytes from a CR value that a class corresponding to a packet can transfer during a scheduling period, and p_size denotes a packet size. In other words, when the class corresponding to the packet has a sufficient CR bandwidth to transfer the packet, CBQ scheduler 410 transfers the packet without queuing. In this case, the packet is forwarded without delay, and it is possible to ensure the CR value set for the class on which zero-delay queuing is performed.

When the packet class does not have a sufficient CR bandwidth to transfer the packet, CBQ scheduler 410 uses unreserved bandwidth existing in the output interface through the second zero-delay scheduling phase.

A pseudocode for performing the second zero-delay scheduling phase is given below.

```
zero_delay_queue_scheduler_phase_2( )
{
    Get interface max forwarding bytes; ------------------------>   step 1
    Get all outbound classes's CR bytes; ------------------------>   step 2
    Get available unreserved forwarding bytes
    (interface max forwarding bytes – all classes's CR bytes); ----->   step 3
    if (available unreserved forwarding bytes)
        packet transmission; ---------------------------------->   step 4
    else
        zero_delay_queue_scheduler_phase_3; -------------------->   step 5
}
```

In step 1, CR bytes that can be transferred during a scheduling period of the output interface is calculated. In step 2, respective CR values set for all outbound classes of the output interface except the corresponding class are summed.

In step 3, a difference between the CR bytes calculated in step 1 and the sum calculated in step 2 is obtained, and thus unreserved bandwidth is calculated. In step 4, when unreserved bandwidth exists, the packet is forwarded while ensuring a PR value. However, when there is no unreserved bandwidth, the packet is queued in step 5 so that it can be transferred through the third zero-delay scheduling phase. In this way, the second zero-delay scheduling phase ensures a PR of the packet class corresponding to zero-delay queue 415 when unreserved bandwidth exists.

A pseudocode for performing the third zero-delay scheduling phase is given below.

```
cbq_scheduler( )
{
    if (zero delay queue is not empty) ------------------------>   step 6
    {
        zero_delay_queue_scheduler_phase_3; ------------------>   step 7
        Get all classes's available CR bytes; ----------------->   step 8
        if (available CR bytes)
            packet transmission; ---------------------------->   step 9
        else
            packet drop; ------------------------------------>   step 10
    }
    Refresh classes max CR bytes in zero delay queue; --------->   step 11
    CR scheduling; -------------------------------------------->   step 12
    PR scheduling; -------------------------------------------->   step 13
}
```

In the pseudocode for performing the third zero-delay scheduling phase as shown above, CBQ determines that whether or not a zero delay queue is empty (step 6). If the zero delay queue is not empty, the third zero-delay scheduling phase (step 7) which includes steps 8-10 is executed. In step 8, unused available bandwidth is calculated from CR bytes of classes of packets queued in the respective general data queues 416, 417 and 418. If the available bandwidth exists, the packet is transmitted without queuing (zero delay) (step 9). If there is no available bandwidth, however, the packet existing in the zero-delay queue 415 is dropped (step 10). In step 11, maximum value of CR bytes of all of the classes in zero delay queue is refreshed. Then CR scheduling (step 12) and PR scheduling (step 13) are executed again during next scheduling period.

Here, the available bandwidth is calculated from the CR bytes by Equation (2) as shown below.

$$\text{avail\_cr\_bytes} = \Sigma \text{ class } CR \text{ bytes} - \Sigma \text{ MIN(class queuing bytes, class } CR \text{ bytes)} \quad (2)$$

As can be seen from Equation (2), after calculating a total of CR bytes set for the classes corresponding to all queues, except zero-delay queue 415, and a total of smaller values between bytes of a packet queued in each of the class queues and waiting for service during the current scheduling period and bytes of a CR value set for each of the classes, a difference between the totals are calculated as the available bandwidth.

When available bandwidth exists, the packet is transferred in step 9. When there is no available bandwidth, however, the packet existing in the zero-delay queue 415 is dropped in step 10.

In this case, the CR byte refresh routine is executed in step 11, and thus CR bytes of the class corresponding to zero-delay queue 415 are ensured during a next scheduling period.

Table 1 below shows performance of zero-delay queuing according to the present invention. The performance was measured by transferring a 64-byte packet during 30 seconds at a rate of 3500 frames per second in a T3 interface, and there were 2 traffic classes, that is, a real-time class and a data class. When the real-time class was allocated to a zero-delay queue and served, a transfer delay was 458 μs, which was the almost same as a transfer delay of 454 μs of a no CBQ service that provided service without queuing. In addition, the data class had a transfer delay of 3 ms when CBQ was applied.

TABLE 1

| | Average delay (μs) | | |
|---|---|---|---|
| | Zero delay queue | CBQ | No CBQ |
| Real time class | 458.8 | 3133.8 | 454.4 |
| Data class | 3051.3 | 3194.9 | 454.6 |

Using zero-delay queuing constructed according to the present invention, it is possible to forward a specific traffic requiring real-time transfer without delay and serve packets corresponding to a zero-delay queue while ensuring a PR value as well as a CR value. In addition, since the zero-delay queuing is based on CBQ, a bandwidth can be adjusted.

While the present invention has been described with reference to exemplary embodiments thereof, it will be understood by those skilled in the art that various changes in from and detail may be made therein without departing from the scope of the present invention as defined by the following claims.

What is claimed is:

1. A zero-delay queuing method, comprising:
    when a packet corresponds to a class set to perform zero-delay queuing, transferring the packet to a zero-delay queue;
    when a size of the packet does not exceed a Committed Rate (CR) value set for the class, transferring the packet to a strict priority transfer queue; and
    forwarding the packet existing in the strict priority transfer queue prior to packets existing in general data transfer queues,
    wherein when the size of the packet exceeds the CR value set for the class, unreserved bandwidth obtained from CR values set for the zero-delay queue and general data queues is further allocated to ensure a Peak Rate (PR)

value of the class, and then the packet is transferred to the strict priority transfer queue.

2. The method of claim 1, wherein when the packet does not correspond to the class set to perform zero-delay queuing, the packet is transferred to a general data queue.

3. The method of claim 1, further comprising:
when it is determined that there is no unreserved bandwidth available, queuing the packet and further allocating unused bandwidth obtained from CR values of classes of packets queued in the respective general data queues to transfer the packet to the strict priority transfer queue.

4. The method of claim 3, wherein the unused bandwidth obtained from CR values of classes of packets queued in the respective general data queues is calculated by summing the bytes of a CR values set for the classes corresponding to all queues except the zero-delay queue, summing smaller values between bytes of a packet queued in each class queue and waiting for service during a current scheduling period and bytes of the CR value set for each of the classes, and then calculating a difference between the sums.

5. The method of claim 4, further comprising:
when an operation period of a corresponding scheduler expires, resetting the CR value using a CR-byte refresh routine and ensuring the CR value for the class of the zero-delay queue during a next scheduling period.

6. A zero-delay queuing system, comprising:
a Class-Based Queuing (CBQ) scheduler transferring a packet corresponding to a class set to perform zero-delay queuing to a zero-delay queue, performing zero-delay scheduling, and then transferring the packet to a driver multiplexer (MUX); and
a driver queue forwarding the packet corresponding to the zero-delay queue prior to a general data packet,
wherein the CBQ scheduler comprises:
the zero-delay queue immediately transferring the packet corresponding to the class set to perform zero-delay queuing to the driver queue without queuing; and
a general data queue transferring a queued packet to the driver queue in every operation period of the CBQ scheduler.

7. The zero-delay queuing system of claim 6, wherein the driver queue comprises:
a strict priority transfer queue forwarding the packet prior to a general data transfer queue; and
the general data transfer queue queuing and forwarding a packet in a predetermined order.

8. The zero-delay queuing system of claim 6, wherein the zero-delay scheduling comprises first to third zero-delay scheduling phases.

9. The zero-delay queuing system of claim 8, wherein in the first zero-delay scheduling phase, the packet corresponding to the class set to perform zero-delay queuing is transferred to a strict priority transfer queue when a size of the packet does not exceed a Committed Rate (CR) value set for the class, and the second zero-delay scheduling phase is performed when the size exceeds the CR value.

10. The zero-delay queuing system of claim 9, wherein in the second zero-delay scheduling phase, CR values set for classes corresponding to the zero-delay queue and general data queues are checked, the packet is transferred to the strict priority transfer queue while ensuring a Peak Rate (PR) value of the class when there is unreserved bandwidth, and the third zero-delay scheduling phase is performed when there is no unreserved bandwidth.

11. The zero-delay queuing system of claim 10, wherein in the third zero-delay scheduling phase, the packet is queued, and when it is determined from the CR values of the classes of packets queued in the respective general data queues that there is unused bandwidth, the unused bandwidth is further allocated to transfer the packet to the strict priority transfer queue.

12. The zero-delay queuing system of claim 6, further comprising the driver MUX transferring the packet received from the CBQ scheduler to the driver queue.

13. The zero-delay queuing system of claim 6, wherein the CBQ scheduler further comprises a class classifier classifying a received packet according to a class with reference to a header of the packet.

14. A zero-delay queuing method, comprising:
determining a traffic class for an input packet when the packet inputs into a class classifier of the CBQ scheduler;
checking whether or not the determined class corresponds to a traffic class of a zero-delay queue;
when a packet corresponds to a class set to perform zero-delay queuing, transferring the input packet to a zero-delay queue;
said zero-delay queue comprising three phases which is a first zero-delay scheduling phase, a second zero-delay scheduling phase and a third zero-delay scheduling phase;
when a packet corresponds to a class set to perform zero-delay queuing, performing said first zero-delay scheduling phase where the packet corresponding to the class set to perform zero-delay queuing is transferred to a strict priority transfer queue when a size of the packet does not exceed a Committed Rate (CR) value set for the class;
when the size exceeds the CR value, performing in the second zero-delay scheduling phase where CR values set for classes corresponding to the zero-delay queue and general data queues are checked, the packet is transferred to the strict priority transfer queue while ensuring a Peak Rate (PR) value of the class when there is unreserved bandwidth;
when there is no unreserved bandwidth, performing said third zero-delay scheduling phase where the packet is queued, and when it is determined from the CR values of the classes of packets queued in the respective general data queues that there is unused bandwidth, the unused bandwidth is further allocated to transfer the packet to the strict priority transfer queue; and
forwarding the packet existing in the strict priority transfer queue prior to packets existing in general data transfer queues.

15. A zero-delay queuing system, comprising:
a driver multiplexer (MUX);
a Class-Based Queuing (CBQ) scheduler transferring a packet corresponding to a class set to perform zero-delay queuing to a zero-delay queue, performing zero-delay scheduling, and then transferring the packet to the driver multiplexer (MUX);
said CBQ comprising a class classifier classifying a received packet according to a class, a zero-delay queue immediately transferring the packet corresponding to the class set to perform zero-delay queuing to the driver queue without queuing, and a plurality of general data queues transferring a queued packet to the driver queue in every operation period of the CBQ scheduler; and
a plurality of driver queues forwarding the packet corresponding to the zero-delay queue prior to a general data packet, each of said driving queues comprising a strict priority transfer queue and a general data transfer queue.

* * * * *